United States Patent Office 2,914,590
Patented Nov. 24, 1959

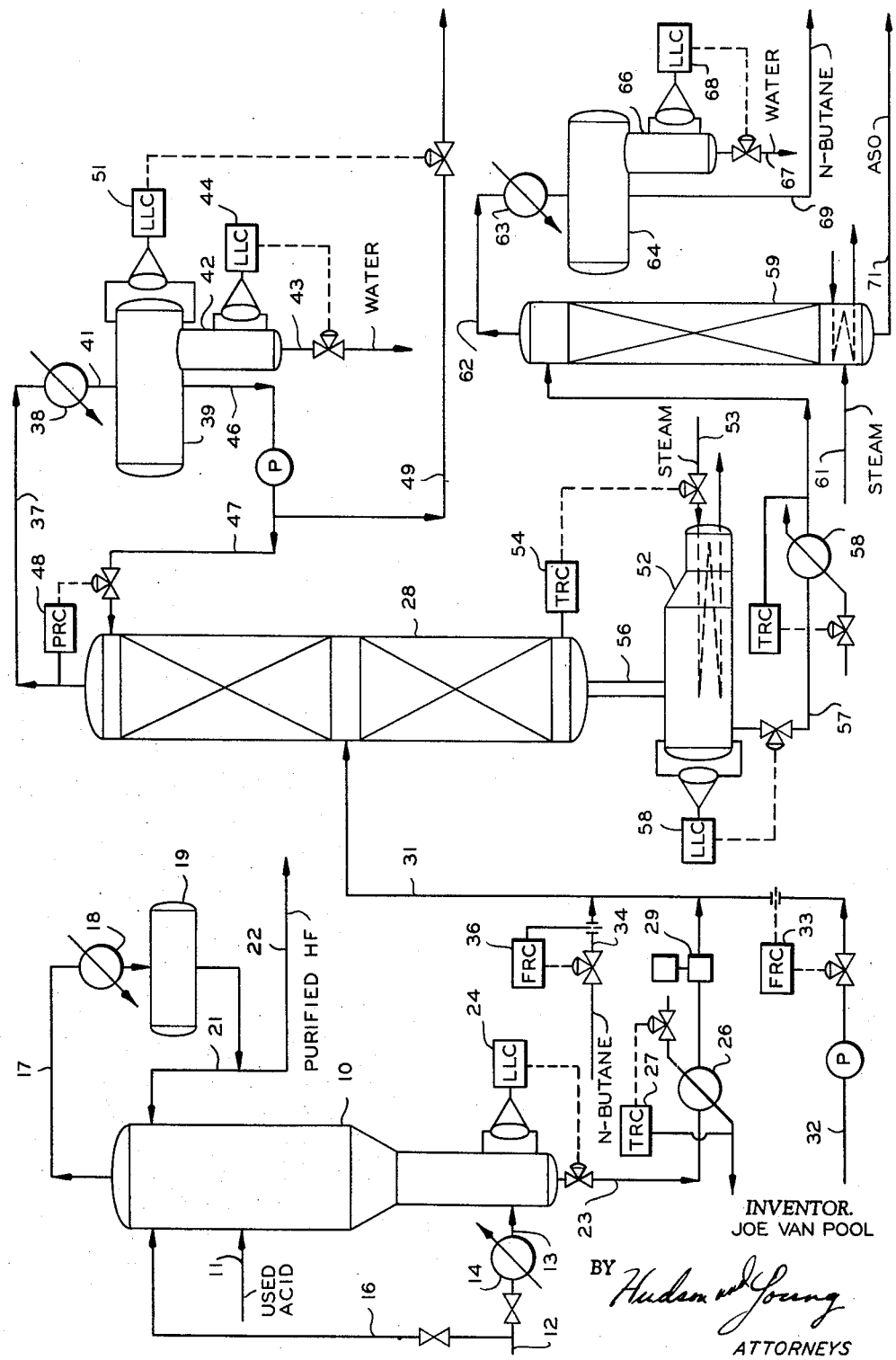

2,914,590

HYDROFLUORIC ACID RECOVERY FROM ALKYLATION ACID WASTE STREAM

Joe Van Pool, Bartlesville, Okla., assignor to Phillips Petroleum Company, a corporation of Delaware Application February 21, 1958, Serial No. 716,671

4 Claims. (Cl. 260—683.41)

This invention relates to hydrofluoric acid recovery from alkylation acid waste stream.

More specifically, my invention relates to an improvement upon the method of hydrogen fluoride recovery described in Patent 2,417,875, granted March 25, 1947, to A. B. Leonard. As set forth by Leonard, hydrogen fluoride is widely used as a catalyst in the alkylation of low-boiling paraffinic hydrocarbons, particularly isobutane and/or isopentane with alkylating reagents, particularly low-boiling olefins such as propylene, various butylenes, and/or various amylenes to form normally liquid paraffins having high octane numbers. The general alkylation process is adequately set forth in the patent referred to and only a general description is presented herein. The reaction is carried out by introducing a suitable amount of hydrofluoric acid which, with recycled acid, provide a hydrocarbon to acid catalyst ratio of about 1:1 to 10:1 on a liquid volume basis. This mixture is intimately admixed in a reaction zone and the resulting mixture passed to a settling zone wherein a phase separation between the liquid hydrocarbon phase and the liquid hydrofluoric acid phase is readily obtained. The hydrofluoric acid phase is withdrawn from the settling zone and most of it returned to the alkylation zone. A small portion, generally within the range of about 1 to about 10 percent by volume, of the acid phase is passed to a purification process. The acid phase to be treated contains the hydrofluoric acid, water, and a high-boiling organic material which is herein referred to as "acid soluble oil." The present invention is directed to an improved purification process.

The following are objects of my invention.

An object of my invention is to remove hydrogen fluoride from an aqueous mixture thereof. A further object is to remove hydrogen fluoride from an acid catalyst which has been used in an alkylation zone. A further object of my invention is to provide an acid recovery process which, in its operation, enables the separation of easily separated materials and which provides the acid in a form which is especially suitable for return to the alkylation zone. Other objects and advantages of the present invention will be apparent to one skilled in the art upon reading the accompanying disclosure which includes A drawing illustrating, in schematic form, apparatus for carrying out my invention.

Broadly, the invention involves treating the stream containing hydrogen fluoride, acid soluble oil, and water with a considerable excess of propylene, supplied as a $C_3$ stream containing a major proportion of propylene, adding at least 10 percent by volume of normal butane, fractionating the resulting mixture to obtain a stream containing a portion of the normal butane and lighter materials and a second portion containing the rest of the normal butane and heavier materials. The materials added to the hydrofluoric acid stream are important and I use exclusively the $C_3$ stream containing propylene for reaction with the hydrofluoric acid to provide isopropyl fluoride. The amount of this stream should be in considerable excess, generally 5 to 15 times the amount to react with free hydrofluoride acid in the oil. Preferably, approximately 10 times that required to react quantitatively with the hydrofluoric acid is used. An excess is required to insure that the product of the reaction is exclusively isopropyl fluoride. Another important feature is the addition of normal butane, this material being added in sufficient quantity to permit complete separation of the propane and isopropyl fluoride from the acid soluble oil. Without this addition this latter separation is difficult. In general, the amount of normal butane added is preferably approximately ¼ of the volume of the liquid to which it is added although a broader range of 10 to 50 percent by volume can be added.

Directing attention to the drawing, the steps of my invention will be more fully understood. In this drawing, the used acid is supplied to a separation tower 10, which is primarily a stripping operation. The acid is supplied by means of conduit 11. While the operation of this tower does not constitute a feature of my invention, a preferred method of operation is to supply isobutane through conduits 12 and 13 to the bottom of the tower 10 at a sufficient temperature to boil the same. The necessary heat can be supplied by means of heater 14. As an alternative, the heat can be supplied by other means (not shown) and isobutane supplied to the top of the tower by means of conduit 16. A mixture of hydrofluoric acid and water is obtained as an overhead product in line 17 which is condensed by condenser 18 and supplied to accumulator 19. A portion of this purified hydrofluoric acid is returned by conduit 21 to column 10 and a portion removed through conduit 22 for return to the alkylation zone. The kettle product from column 10 is removed through conduit 23, this removal being controlled by liquid level controller 24. This kettle product contains hydrofluoric acid, acid soluble oil, a small amount of water, and a small amount of the isobutane. This product is cooled by means of cooler 26, controlled by temperature recorder controller 27 and pumped to column 28 by means of pump 29 and conduit 31. A $C_3$ stream containing a major amount of propylene is supplied by means of conduit 32 to the cooled kettle product in conduit 31, the addition of this $C_3$ stream being controlled by flow recorder controller 33. Normal butane is also added to this stream, this material being supplied by conduit 34 to conduit 31, this addition being downstream of the addition of the $C_3$ hydrocarbon. Supply of normal butane is controlled by means of flow recorder controller 36. Stripping tower 28 operates to provide an overhead product in conduit 37, this overhead product containing propylene, propane, isopropyl fluoride, a portion of the normal butane, and a small amount of isobutane if isobutane was added to column 10. This stream is condensed by cooling means 38 and supplied to accumulator 39 by means of conduit 41. This accumulator 39 is provided with a well 42 in which any water in said overhead collects. Removal of this water is by means of conduit 43, this removal being regulated by a controller such as an electroprobe level controller 44. A reflux stream is withdrawn from accumulator 39 by means of conduit 46, a portion thereof being supplied to stripping tower 28 by means of conduit 47, flow thereof being controlled by pressure recorder controller 48. The balance of the material from accumulator 39 is supplied to the alkylation zone by means of conduit 49, this removal being controlled by liquid level controller 51.

Stripping tower 28 is provided with reboiler 52 supplied by steam from conduit 53, the amount of steam being controlled by temperature recorder controller 54. Conduit 56 connects stripping tower 28 and reboiler 52, this conduit 56 being of sufficient size to permit liquid to flow downwardly therethrough and vapors to flow upwardly. The higher boiling materials are removed from reboiler 52 by means of conduit 57, this removal being controlled by liquid level controller 58. The components in this kettle product comprise normal butane which is not in the overhead product, some water, and acid soluble oil. This mixture is heated by heater 58 and supplied to column 59. Column 59, supplied by steam in conduit 61 strips normal butane from the acid soluble oil, the butane appearing overhead in conduit 62. The overhead is cooled by cooler 63 and collected in accumulator 64. This accumulator is provided with a well 66 in which water collects for removal through conduit 67, this removal being controlled by a level controller 68. This level controller 68 can, advantageously, be an electro-probe level controller of the same design as liquid level controller 44. Normal butane is recovered in conduit 69, and this material can be recycled to conduit 34 for supply to conduit 31 as previously set forth. The kettle product from column 50 comprises the acid soluble oil and which is passed by means of conduit 71 to storage. This acid soluble oil is completely free of hydrofluoric acid.

The following example sets forth one specific method of operating in accordance with my invention but, obviously, temperatures and pressures can be considerably varied without deviating from the basic concept of the invention.

*Example*

Used acid from the separator was supplied to column 10 at about 330° F., this column operating at a pressure of about 120 p.s.i.g., and an overhead temperature of approximately 260° F. and a kettle temperature of approximately 275° F. This kettle temperature is maintained by heating isobutane which is subsequently supplied to the bottom of the column. The kettle product comprises, in this one installation, 1000 pounds per day of hydrofluoric acid, 15 barrels per day of acid soluble oil, 2 to 5 barrels per day of water, and 0.3 to 0.8 barrel per day of isobutane. This kettle product is cooled from 275° F. to 150° F. by supply of cooled water to cooler 26. The $C_3$ cut supplied by means of conduit 32 is approximately 200 barrels per day, the mixture containing 60 percent propylene. This propylene is approximately 10 times the amount required to react with the available free hydrofluoric acid. By means of conduit 34 approximately 50 barrels per day of normal butane are added to the mixture of the kettle product from column 10 and the $C_3$ cut. This mixture is then supplied to stripping tower 28 which is operated at 200 p.s.i.g. and 120° F. The isopropyl fluoride boils in approximately the same range as isobutane and therefore is fractionated overhead with about half of the normal butane. The remaining normal butane leaves the bottom of the stripper, this normal butane giving a bubble point of the bottoms low enough to be reboiled with steam. The reboiler is operated at approximately 230° F.

The overhead from tower 28, as stated, contains some water, propane, propylene, isopropyl fluoride, isobutane, and normal butane. It is cooled to approximately 100° F. by means of cooler 38. Substantially all the water accumulates in well 42 and is removed by conduit 43. Approximately 100 barrels per day of the overhead after water removal is returned by means of conduit 47 to the top of tower 28 as a reflux stream. The overhead make, approximately 220 barrels per day, is returned to the alkylation unit. The isopropyl fluoride obtained is particularly suitable for use in the alkylation process because, when alkylated, it produces an advantage in quality of alkylate compared to that produced using propylene alone.

The kettle product in conduit 57 comprising water, normal butane, and the acid soluble oil, is passed to stripping column 59 which is supplied with steam to provide a top pressure of approximately 100 p.s.i.g. and a temperature of 300° F. The overhead comprising normal butane and water is cooled and supplied to accumulator 64. Water is separated from the normal butane and the butane returned to the operation. The kettle product comprises the 15 barrels per day of acid soluble oil which was present in the kettle product from stripping tower 10.

It will be apparent to those skilled in the art that the accompanying figure is somewhat simplified in that many additional valves, pumps, and other usual components are not shown.

As many possible embodiments can be made of this invention without departing from the scope thereof, it is to be understood that all matter herein set forth is to be interpreted as illustrative and not as unduly limiting the invention.

I claim:

1. In an alkylation process wherein a low-boiling isoparaffin is reacted with a low-boiling olefin in the presence of a hydrofluoric acid catalyst in an alkylation zone and wherein an acid phase is treated to recover hydrofluoric acid therefrom, a used acid recovery process comprising introducing said used acid into a first separation zone; recovering purified hydrofluoric acid as an overhead from said first separation zone; recovering a kettle product from said first separation zone, said kettle product comprising hydrofluoric acid, acid soluble oil, and water; contacting said kettle product with a $C_3$ hydrocarbon stream containing a major proportion of propylene, the amount of propylene in said $C_3$ hydrocarbon stream being 5 to 15 times that required to react quantitatively with hydrofluoric acid in said kettle product; adding normal butane to the mixture of kettle product and $C_3$ hydrocarbon stream, the volume of butane being at least 10 percent of the volume of said mixture; passing the resulting mixture to a second separation zone, recovering an overhead from said second separation zone comprising isopropyl fluoride, propane, propylene, and normal butane and water; separating water from said overhead and returning a stream containing isopropyl fluoride, propane, propylene and normal butane to the alkylation zone; recovering a kettle product from said second separation zone, said kettle product comprising acid soluble oil, water and normal butane; passing said last-mentioned stream to a third separation zone; recovering an overhead stream from said third separation zone comprising water and normal butane; and recovering a kettle product from said third separation zone comprising acid soluble oil.

2. In an alkylation process wherein a low-boiling isoparaffin is reacted with a low-boiling olefin in the presence of a hydrofluoric acid catalyst in an alkylation zone and wherein an acid phase is treated to recover hydrofluoric acid therefrom, a used acid recovery process comprising introducing said used acid into a first separation zone; recovering purified hydrofluoric acid as an overhead from said first separation zone; recovering a kettle product from said first separation zone, said kettle product comprising hydrofluoric acid, acid soluble oil, and water; contacting said kettle product with a $C_3$ hydrocarbon stream containing a major proportion of propylene, the amount of propylene in said $C_3$ hydrocarbon stream being 5 to 15 times that required to react quantitatively with hydrofluoric acid in said kettle product; adding normal butane to the mixture of kettle product and $C_3$ hydrocarbon stream, the volume of butane being from 10 to 50 percent of the volume of said mixture; passing the resulting mixture to a second separation zone; recovering an overhead from said second separation zone comprising isopropyl fluoride, propane, propylene, and normal butane and water; separating water from said overhead and returning a stream containing isopropyl fluoride, propane, propylene and normal butane to the alkylation zone; recovering a kettle product from said second separation zone, said kettle product comprising acid soluble oil, water and normal butane; passing said last-mentioned stream to a third separation zone; recovering an overhead stream from said third separation zone comprising water and normal butane; and recovering a kettle product from said third separation zone comprising acid soluble oil.

3. In an alkylation process wherein a low-boiling isoparaffin is reacted with a low-boiling olefin in the presence of a hydrofluoric acid catalyst in an alkylation zone and wherein an acid phase is treated to recover hydrofluoric acid therefrom, a used acid recovery process comprising introducing said used acid into a first separation zone; recovering purified hydrofluoric acid as an overhead from said first separation zone; recovering a kettle product from said first separation zone, said kettle product comprising hydrofluoric acid, acid soluble oil, and water; contacting said kettle product with a $C_3$ hydrocarbon stream containing a major proportion of propylene, the amount of propylene in said $C_3$ hydrocarbon stream being approximately 10 times that required to react quantitatively with hydrofluoric acid in said kettle product; adding normal butane to the mixture of kettle product and $C_3$ hydrocarbon stream, the volume of butane being at least 10 percent of the volume of said mixture; passing the resulting mixture to a second separation zone; recovering an overhead from said second separation zone comprising isopropyl fluoride, propane, propylene, and normal butane and water; separating water from said overhead and returning a stream containing isopropyl fluoride, propane, propylene and normal butane to the alkylation zone; recovering a kettle product from said second separation zone, said kettle product comprising acid soluble oil, water and normal butane; passing said last-mentioned stream to a third separation zone; recovering an overhead stream from said third separation zone comprising water and normal butane; and recovering a kettle product from said third separation zone comprising acid soluble oil.

4. In an alkylation process wherein a low-boiling isoparaffin is reacted with a low-boiling olefin in the presence of a hydrofluoric acid catalyst in an alkylation zone and wherein an acid phase is treated to recover hydrofluoric acid therefrom, a used acid recovery process comprising introducing said used acid into a first separation zone; recovering purified hydrofluoric acid as an overhead from said first separation zone; recovering a kettle product from said first separation zone, said kettle product comprising hydrofluoric acid, acid soluble oil, and water; cooling said kettle product to a temperature of approximately 150° F.; contacting said kettle product with a $C_3$ hydrocarbon stream containing a major proportion of propylene, the amount of propylene in said $C_3$ hydrocarbon stream being 5 to 15 times that required to react quantitatively with hydrofluoric acid in said kettle product; adding normal butane to the mixture of kettle product and $C_3$ hydrocarbon stream, the volume of butane being at least 10 percent of the volume of said mixture; passing the resulting mixture to a second separation zone; recovering an overhead from said second separation zone comprising isopropyl fluoride, propane, propylene, and normal butane and water; separating water from said overhead and returning a stream containing isopropyl fluoride, propane, propylene and normal butane to the alkylation zone; recovering a kettle product from said second separation zone, said kettle product comprising acid soluble oil, water and normal butane; passing said last-mentioned stream to a third separation zone; recovering an overhead stream from said third separation zone comprising water and normal butane; and recovering a kettle product from said third separation zone comprising acid soluble oil.

References Cited in the file of this patent

UNITED STATES PATENTS

| | | |
|---|---|---|
| 2,417,875 | Leonard | Mar. 25, 1947 |
| 2,448,601 | Kelley | Sept. 7, 1948 |
| 2,614,132 | Lee et al. | Oct. 14, 1952 |